J. Hoyt,

Pipe Coupling.

No. 98,501.    Patented Jan. 4, 1870.

Witness
Jos. G. E. Lamen
Gardner D'Wiscoy

Jacob Hoyt
Inventor

United States Patent Office.

JACOB HOYT, OF NEW YORK, N. Y., ASSIGNOR TO JAMES O. MORSE, OF ENGLEWOOD, NEW JERSEY.

Letters Patent No. 98,501, dated January 4, 1870.

IMPROVEMENT IN LEAD-PIPE COUPLING.

The Schedule referred to in these Letters Patent and making part of the same.

*To all whom it may concern:*

Be it known that I, JACOB HOYT, of New York, in the county of New York, and State of New York, have invented a new and useful Improvement in Lead-Pipe Couplings; and I do hereby declare that the following is a full, clear, and exact description thereof, and of its mode or manner of operation, reference being had to the accompanying drawings, and to the letters of reference marked thereon, and making a part of this specification, in which—

Figure 2:
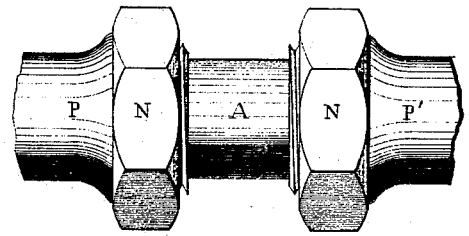
Figure 1:
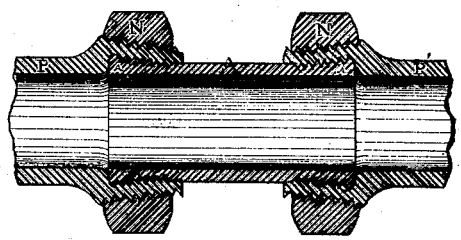
Figure 4:
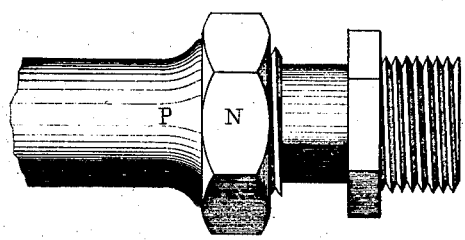
Figure 3:
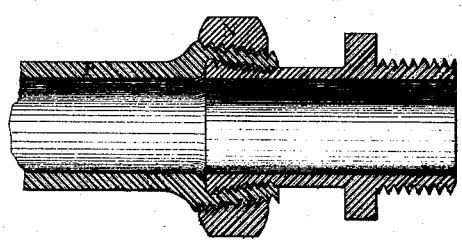
Figure 6:
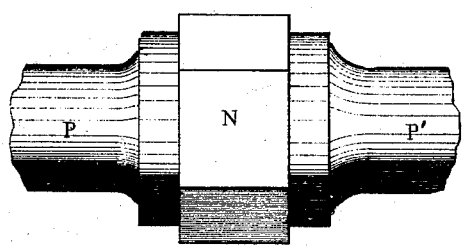
Figure 5:
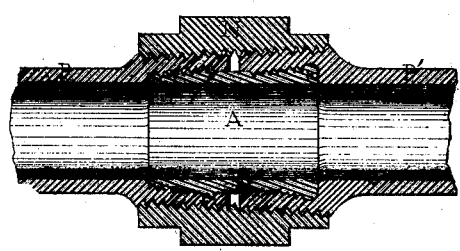

Figures 1, 3, and 5, represent longitudinal sections through the axis of the coupling, and the pipe to which it is fitted, and Figures 2, 4, and 6, represent the corresponding side views, showing the joint completed, in various forms hereafter explained.

My improved coupling consists essentially of two parts, to wit, the thimble A and the nut N, or their equivalents.

The thimble A has an enlargement, $a$, at the end, tapering slightly toward the body, the surface of which enlargement is roughened by grooves or corrugations running around it, and at right angles to its length.

The thread or screw in the nut N is cut on a taper corresponding to that on the enlarged part of the thimble.

When the pipe P is to be connected to another lead pipe P', both ends of the thimble are formed in the way above described, as shown in fig. 1. When it is to be connected with anything else than lead pipe, the thimble may terminate at the other end in a flange, a screw, or any other form of connection suitable for the purpose required, as illustrated by figs. 3 and 4.

To make a joint by means of this coupling, the mouth of the pipe is first opened out a little, by driving into it a taper plug, or otherwise, enough to admit the enlarged end $a$ of the thimble A, which is then inserted. The lead is then closed down around and over the enlarged part, by a few blows with a hammer, or other suitable means, so as to hold the thimble in place, and allow the nut N to take hold. The nut is then screwed up upon it, cutting its own thread upon the lead as it advances, and at the same time forcing it into the grooves or corrugations on the thimble, thus insuring a close contact, and forming a perfectly tight joint.

The form and application of this coupling may be considerably varied, without changing its essential character, but the only modification which I think it necessary to describe particularly, is one which includes an additional improvement, as shown in figs. 5 and 6, where a single nut performs the function of the two nuts, in the form already described, and exhibited in figs. 1 and 2.

To accomplish this, the thimble is made with the taper on one end reversed, being smallest at the end, and largest toward the middle.

This end is inserted in the pipe P far enough for a portion to project over the enlarged part, which overlapping lip is then partially turned down over and around the base of the conical enlargement. This is necessary, in order to hold the thimble in place against the action of the screw in cutting, which otherwise would simply drive it out of the pipe.

The opposite end of the thimble may now be inserted in the pipe P', and the lead closed down around it, as first above explained.

The nut N, which should have been previously slipped over the pipe P, is now advanced upon it, cutting its thread in the lead, and forcing the overlapping end down into close contact with the grooves on the other side of the enlargement, thus making the joint doubly sure.

Advancing it still further, to the position shown in fig. 5, it will form the joint between the further end of the thimble and the pipe $p$, this part of the process being the same as that first above explained, except that a separate nut is not required for it.

The thimble may be made, except in the case last mentioned, of such size as to enter the pipe without its being previously enlarged, but this will involve a contraction of the bore, which is to be avoided, whereas, when made as shown in the figures, the pipe and the coupling may be of the same calibre, giving to the contained liquid a continuous passage, and an uninterrupted flow through both.

That which I claim as new in the coupling thus described, and desire to secure by Letters Patent, is—

1. The thimble A, with a conical enlargement at one or both ends, and the nut or ring N, when combined, applied, and used substantially as described, for the purpose of a lead-pipe coupling.

2. The two joints at the opposite ends of the thimble, applied and operating substantially as described.

JACOB HOYT.

Witnesses:
JOS. G. E. LARNED,
ELIE BOUIN.